US012793470B2

(12) United States Patent
Pinkus et al.

(10) Patent No.: US 12,793,470 B2
(45) **Date of Patent: *Nov. 10, 2026**

(54) TAMPER EVIDENT SYSTEM FOR MODIFICATION AND DISTRIBUTION OF SECURED VEHICLE OPERATING PARAMETERS

(71) Applicant: IVSC IP LLC, Las Vegas, NV (US)

(72) Inventors: Michael Collins Pinkus, Alpharetta, GA (US); James Alan Wisniewski, Las Vegas, NV (US)

(73) Assignee: IVSC IP LLC, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/535,548

(22) Filed: Feb. 10, 2026

(65) Prior Publication Data

US 2026/0162464 A1 Jun. 11, 2026

Related U.S. Application Data

(63) Continuation of application No. 18/903,772, filed on Oct. 1, 2024, now Pat. No. 12,548,377, which is a (Continued)

(51) Int. Cl.
*G07B 13/00* (2006.01)
*G06F 21/86* (2013.01)
(Continued)

(52) U.S. Cl.
CPC ............. *G07B 13/00* (2013.01); *G06F 21/86* (2013.01); *G06Q 20/3829* (2013.01); *H04L 67/12* (2013.01); *G06Q 10/06* (2013.01)

(58) Field of Classification Search
CPC ............... G06Q 10/06; G06Q 20/3829; G06Q 2220/00; G06Q 30/02; G06F 21/86; G07B 13/00; H04L 67/12
(Continued)

(56) References Cited

U.S. PATENT DOCUMENTS 4,217,484 A * 8/1980 Gerst ..................... G07B 13/00 235/30 A
6,565,443 B1 * 5/2003 Johnson .................. A63F 13/71 714/36
(Continued)

FOREIGN PATENT DOCUMENTS

WO WO-2004047046 A1 * 6/2004 ............. G08G 1/133

*Primary Examiner* — Wodajo Getachew
(74) *Attorney, Agent, or Firm* — Peacock Law P.C.; Justin R. Jackson; Daniel Berenger-Russell

(57) ABSTRACT

Systems and methods of securing, distribution and enforcing for-hire vehicle operating parameters are described whereby a first computer system maintaining the parameters generates a data packet that is distributed to a second computer system which acts as a meter (such as a taximeter, limousine meter or shuttle meter) for the for-hire vehicle. The first computer system may secure or encrypt the data packet according to a security protocol associated with the second computer system. Once the second computer system receives the data packet, it may validate and extract the operating parameters contained within it. The second computer system may then store the operating parameters and operate according to the parameters by, for example, calculating fares for passengers that make use of the for-hire vehicle associated with the second computer system. The second computer system may include a secure segment that is attached to the for-hire vehicle and a non-secure segment that may be easily removed to prevent theft or for repairs.

16 Claims, 5 Drawing Sheets

Related U.S. Application Data continuation of application No. 16/384,797, filed on Apr. 15, 2019, now Pat. No. 12,105,864, which is a continuation of application No. 15/073,499, filed on Mar. 17, 2016, now abandoned, which is a continuation of application No. 13/116,856, filed on May 26, 2011, now abandoned.

(51) Int. Cl.
*G06Q 10/06* (2023.01)
*G06Q 20/38* (2012.01)
*H04L 67/12* (2022.01)

(58) Field of Classification Search
USPC .............................................................. 705/71
See application file for complete search history.

(56) References Cited

U.S. PATENT DOCUMENTS

| | | | | |
|---|---|---|---|---|
| 6,686,834 | B1 * | 2/2004 | Tamam | G06Q 30/0284 705/417 |
| 7,567,940 | B1 * | 7/2009 | Engelberg | G06Q 20/10 705/50 |
| 2006/0168580 | A1 * | 7/2006 | Harada | G06F 21/10 717/174 |
| 2007/0257813 | A1 * | 11/2007 | Vaswani | G01D 4/004 340/870.02 |
| 2012/0074927 | A1 * | 3/2012 | Ramirez | G01R 22/066 324/110 |

* cited by examiner

TAMPER EVIDENT SYSTEM FOR MODIFICATION AND DISTRIBUTION OF SECURED VEHICLE OPERATING PARAMETERS

CROSS-REFERENCE TO RELATED APPLICATIONS

This application is a continuation of U.S. patent application Ser. No. 18/903,772, filed on Oct. 1, 2024, entitled "TAMPER EVIDENT SYSTEM FOR MODIFICATION AND DISTRIBUTION OF SECURED VEHICLE OPERATING PARAMETERS" (now issued as U.S. Pat. No. 12,548,377), which is a continuation of U.S. patent application Ser. No. 16/384,797, filed Apr. 15, 2019, entitled "TAMPER EVIDENT SYSTEM FOR MODIFICATION AND DISTRIBUTION OF SECURED VEHICLE OPERATING PARAMETERS" (now issued as U.S. Pat. No. 12,105,864), which is a continuation of U.S. patent application Ser. No. 15/073,499, filed Mar. 17, 2016, entitled "TAMPER EVIDENT SYSTEM FOR MODIFICATION AND DISTRIBUTION OF SECURED VEHICLE OPERATING PARAMETERS", which is a continuation of U.S. patent application Ser. No. 13/116,856, filed May 26, 2011, entitled "TAMPER EVIDENT SYSTEM FOR MODIFICATION AND DISTRIBUTION OF SECURED VEHICLE OPERATING PARAMETERS", and the specifications and claims thereof are incorporated herein by reference.

BACKGROUND OF THE INVENTION

Field of the Invention

The present disclosure relates to the field of for-hire vehicles such as taxis, limousines, shuttles, buses or any other vehicle that provides shared transportation or transports one or more passengers between locations of the passengers' choice.

Background

A for-hire vehicle (FHV) generally charges fares based on several variables. The variables may include the distance traveled, the time spend traveling, the number of passengers hiring the FHV, etc. The cost associated with each of these variables is often set by a regulatory agency that regulates the for-hire vehicles ("FHVs") within its jurisdiction of control. Typically, the jurisdiction of control corresponds to a city or metro area, however, in some cases it may be a county, several counties, or even an entire state. Regulatory agencies may also issue licenses to operate FHVs within their jurisdiction of control. The licenses may correspond to a timeframe, such as a year, or they may permit the operation of a FHV only within a particular area within the jurisdiction of control. In some jurisdictions, medallions corresponding to the license may be issued. The medallions may be affixed to the FHV and indicate type of license associated with the FHV.

The calculation of fares for a trip in a FHV is typically done by a meter. A meter is programmed with the variables used to calculate the fare along with the values associated with those variables that the regulatory agency has determined. When a FHV is hired for a trip, the meter is typically started and then when the trip is over the meter is stopped. In most cases the fare amount is displayed in real time via a display that is part of the meter. Currently meters are separate devices that are affixed to a FHV. FHV meters are programmed by the regulatory agency regulating the FHV to which the meter is affixed.

Unfortunately, the business of operating for-hire vehicles ("FHVs") is susceptible to fraud. As a result, regulatory agencies seal FHV meters so that no one may tamper with the meter, or the data within the meter, without detection. Once the regulatory agency sets the fare rates for the meter, the entire meter is then locked with a physical seal that prevents, or shows evidence of, tampering. Once the meter is sealed, all components that are part of the meter, such as fare displays and receipt or trip sheet printers are also sealed. The physical sealing process makes updating rates particularly difficult. If the regulatory agency wishes to change rates, an agent of the regulatory agency must break the seal on each meter in the jurisdiction, perform the necessary updates, then reseal the meter. The update process can be very labor intensive as some regulatory agencies may regulate several thousand FHV meters, each of which needs to be manually opened, updated and resealed when updated. The process can also be rather expensive. Some regulatory agencies pass the cost of opening and resealing the meter onto the FHV fleet operator. In addition, the FHV fleet operator also incurs an opportunity cost by having to remove a FHV from the fleet so that its meter can be updated.

Since updating meters is time consuming and expensive, it tends to be done as little as possible. In some cases this may lead to missed revenue opportunities. For example, in some jurisdictions, if fuel prices increase substantially above the rate base, fleet owners may be allowed to help offset the fuel price increase by requesting that the regulatory agency permit a fuel surcharge. Fuel surcharges, however, are often temporary since they may only apply when fuel prices are unusually high. Thus, implementing a surcharge often requires two modifications to the meter; one modification to include the fuel surcharge when fuel prices increase, and a second when fuel prices return to the existing rate base. Thus, since the regulatory agencies generally bear the direct cost of updating the meters, they may resist implementation of fuel surcharges because the cost of implementing the surcharge (updating the meters) is charged against the agency's budget. Further, this cost may eventually be passed on to the consumer through higher regulatory agency fees. In addition, regulatory agencies may also wish to increase fares temporarily as a result of a special event in order to take advantage of period when FHV use may be high. Since a change in fares due to a special event is limited in duration, special event surcharges suffer the same problems as fuel surcharges; the cost of updating the fare information in the meter is often higher than the extra revenue that could be generated by incorporating the surcharge.

In addition, since the entire meter is sealed by the regulatory agency, repairs to the meter require an agent to reseal the meter before it is returned to service. Often times, the portion in need of repair is not related to the aspects of the meter that are regulated, such as calculation of fares. For example, if the display screen of the meter needs to be repaired or replaced, the meter must be resealed by the regulatory agency before the meter is returned to service even though the display screen may not be the portion of the meter which is subject to fraud. Since the meter must be resealed for every repair, meters are unnecessarily expensive to repair and may out of service longer than needed.

BRIEF SUMMARY OF THE INVENTION

The present disclosure focuses on systems and methods for updating the parameters of a for-hire vehicle meter without requiring physically breaking the regulatory seal of the meter and then resealing the entire meter. The present disclosure describes embodiments that would allow for repair of the non-regulated portions of the FHV meter (such as a screen display) without requiring the regulatory agency to physically reseal the meter. In addition, the present disclosure describes embodiments that may allow the non-secure portions of the FHV meters to be moved from one FHV to another without requiring the intervention of a regulatory agency.

One embodiment of the disclosure describes a for-hire vehicle meter comprising a secured, tamper-evident portion. By separating the portions of the meter under regulatory control from the portions of the meter not under regulatory control, repairs to the meter may not require resealing of the entire meter. The secured, tamper-evident portion may comprise a tamper-evident, tangible, computer-readable medium storing software instructions for receiving updated FHV operating parameters, such as fare information. The received operating parameters may be sealed by the regulatory agency using a security protocol, such as encryption. The FHV meter comprises data for decrypting the operating parameters. Once decrypted, the FHV meter may store the operating parameters and operate according to the updated parameters. The tamper-evident portion of the meter may also comprise a tampering indicator. The tamper indicator may indicate a first state when someone has tampered with the meter, such as when someone has attempted to load non-regulatory, unapproved operating parameters onto the meter. The tamper indicator may also indicate a second state when no one has tampered with the meter.

The present disclosure also describes a method for updating the operating parameters of a for-hire vehicle ("FHV") meter or computer system, whereby a computer system for defining FHV operating parameters generates a data packet that is distributed to one or more FHV meters. The computer system may allow for the definition, maintenance, and modification of FHV parameters. The computer system may also maintain data associated with the one or more FHV meters, including data uniquely identifying the meters. The computer system may also have access to a security protocol of the FHV meters that is used by the FHV meters to decrypt data. When the operator of the computer system wishes to update the operating parameters of the FHV meters, it may generate a data packet containing the new parameters. The computer system may then secure the data packet according to the security protocol of the FHV meter. Once the data packet has been generated and secured, it may then be distributed to the FHV meter for which it is intended.

DETAILED DESCRIPTION OF THE INVENTION

Embodiments of the disclosure will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the disclosure. Furthermore, embodiments of the disclosure may include several novel features, no single one of which is solely responsible for its desirable attributes or which is essential to practicing the embodiments of the disclosure herein described.

Figure 1:
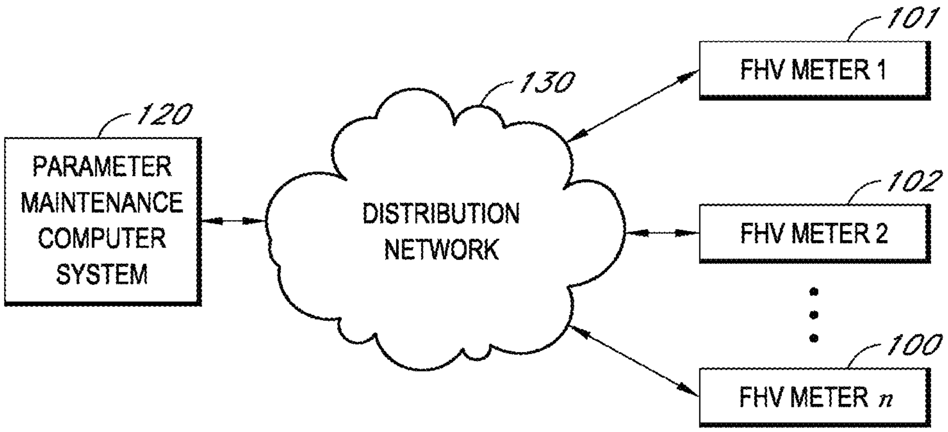
FIG. 1 is a block diagram showing one embodiment of a parameter maintenance computer system in communication with more than one for-hire vehicle meter.

FIG. 1 is a block diagram showing one embodiment of parameter maintenance computer system 120 in communication with more than one for-hire vehicle ("FHV") meter 100, 101, 102. Parameter maintenance computer system 120 may be a computer system responsible for the maintenance of FHV parameters. In general, FHV parameters are values defining the operation of for-hire vehicles. A set of FHV parameters may be stored in FHV meters associated with a FHV, such as FHV meter 100, 101 and 102. In general, FHV parameters are configurable and may change over time. Regulatory bodies may set regulations dictating the terms by which for-hire vehicles ("FHVs") may operate, and FHV parameters may be stored in FHV meter 100 reflecting those terms. The regulatory bodies may change the regulations, in some cases temporarily, compared to when the FHV meter was installed on its associated FHV. Accordingly, the FHV parameters require updating from time to time.

For-hire vehicle (FHV) parameters may include, for example, values defining fees based on time and distance traveled. In one embodiment, the FHV parameters may include a distance increment type value indicating the type of distance increment for which fares should be calculated such as, for example, meters, kilometers, or miles. FHV parameters related to defining fees based on time and distance traveled may also include a distance increment indicating the increment of the distance type to calculate fares. For example, the increment may be 0.5 of a mile, or 100 meters, or alternatively, 0.1 kilometers. The parameters may also include a fee value per distance increment, such as, for example $0.50. Several parameters may be combined to define the fees based on time and distance traveled for a particular trip taken by a FHV. For example, the distance increment type may be miles, the distance increment may be 0.125 of a mile, and the fee per distance traveled may be $0.25. Thus, if a passenger used a FHV vehicle for 0.5 miles, they maybe charged a $1.00 fare.

FHV parameters defining fees based on time and distance traveled may also include time related parameters. In one embodiment, the FHV parameter may include a time increment type, such as second or minute, that defines the type of time used to calculate time based fares. The FHV parameters may also include a time increment such as 1 second or 0.5 minutes. In one embodiment, a fee per time value may also be among the FHV parameters. For example, a fee per time value (such as $26) may be associated with a particular time increment type (such as hours) and time increment (such as 1 hour), resulting in a fee per time value of $26 per 1 hour. In one embodiment, time based parameters may be used in lieu of distance based parameters. This may occur for example in a FHV that operates based on a fixed tariff such as a limousine. In other embodiments, time based parameters may be used in conjunction with distance based parameters. In other embodiments, time based parameters may only be used during times when a FHV is hired but not moving, and distance based parameters may be used when the vehicle is moving. The FHV parameters may include, in such embodiments, a value indicating how time and distance parameters are to be used in relationship to each other. For example, in one embodiment the time-distance relationship parameter may be "distance only" or it may be "time at idle." In other embodiments, numeric values may be used instead of string values.

In some embodiments, regulations affecting for-hire vehicles ("FHVs") may set special fares based on a geospatial point. The special fare may affect the time and distance-traveled parameters, or it may be an additional flat fare added to the regular time and distance-traveled parameters. For example, in one embodiment, there may be a special rate based on a geospatial point corresponding to the airport. The fee may be, for example, $2.00. Thus, in such embodiments, $2.00 may be added to a fare when a passenger using the FHV is picked up at the airport. In other embodiments, the geospatial point may affect the time and distance-traveled parameters. For example, if a passenger is picked up at the airport, they may be charged a fare of $0.32 per half kilometer as opposed to $0.30 per half kilometer.

In some embodiments, the FHV parameters define variable operating cost surcharges. In some embodiments, variable operating cost surcharges may be applied by a regulatory agency to help offset an unexpected cost to the FHV operator. For example, a fuel surcharge may be added to fares in order to offset unexpected rise in fuel prices. The FHV parameters may define the surcharge as a flat surcharge (one charge per fare) or as an additional per-distance surcharge (for example, and extra $0.05 per mile). In one embodiment the FHV parameters relating to variable operating cost surcharges may indicate a surcharge type. The surcharge type may in some embodiments be a string, such as "flat" or "per-distance."

The FHV parameters may also include a parameter indicating a surcharge for fare initiation or fare termination. A fare initiation fee may be a one time fee that is charged at the start of a fare, or trip. If, for example, the fare initiation fee is $2.35, a passenger might be charged at least $2.35 for the trip. As the trip progresses, the passenger may be charged additional time and distance-traveled fees according to other FHV parameters stored on the FHV meter.

In some embodiments, for-hire vehicle ("FHV") parameters may be grouped together. In such embodiments, group-FHV parameters may apply to a collection of FHV parameters to indicate that they are to apply only when the conditions of the group-FHV parameters are met. For example, in some embodiments, it may be desirable to limit the application of FHV parameters to a specific period of time. In such embodiments, there may be additional group-FHV parameter indicating the start time and/or end time for the set of FHV parameters. For example, special rates may apply to weekends, holidays or special events. Accordingly, the FHV parameters may be include a start date and end date that correspond to the weekend, holiday or special event. In other embodiments, it may be desirable to define FHV parameters for mutually exclusive geospatial regions within the FHV's operating region. For example, suppose a FHV serves a north region and south region. The north region may be larger and less developed than the south region. As a result, when a FHV makes a trip from the airport into the north region, there is low likelihood that the FHV will be able to pick up another passenger in the north region to bring back to the airport. Accordingly, fare rates for the north region may be higher than for the south region where the FHV is more likely to pick up another passenger quickly. In this example, FHV parameters for the north region may be different from FHV parameters from the south region. The north region's FHV parameters may be grouped by one group-FHV parameter defining a first geospatial polygon (the north region) and the south region's FHV parameters may be grouped by a different group-FHV parameter defining a second geospatial polygon (the south region).

Returning to FIG. 1, parameter maintenance computer system 120 may be responsible for maintaining the FHV parameters and packaging the FHV parameters in a manner that FHV meters 100, 101, and 102 can interpret. While certain examples of FHV parameters are provided herein, one skilled in the art can appreciate that other FHV parameters may be defined, maintained and configured by parameter maintenance computer system for deployment on FHV meters 100, 101, and 102, and such parameters should not be deemed limited by the examples provided herein.

In one embodiment, parameter maintenance computer system 120 may be a computer system operated by an entity responsible for the regulation of for-hire vehicles. For example, parameter maintenance computer system 120 may be operated by New York City Taxi and Limousine Commission or the Nevada Taxi Cab Authority. In another embodiment, parameter maintenance computer system 120 may be operated by a company that operates a fleet of for-hire vehicles ("FHVs"). The company may operate in a jurisdiction that allows the update of for-hire vehicles by fleet companies as opposed to a regulatory agency.

In one embodiment, the FHV parameters may be distributed over distribution network 130. Distribution network 130 may be, in some embodiments, a computer network. Depending on the embodiment, distribution network 130 may comprise one or more of any type of network, such as one or more local area networks, wide area networks, personal area networks, telephone network, and/or the Internet, which may be accessed via any available wired and/or wireless communication protocols. Thus, distribution network 130 may comprise a secure LAN through which FHV meter 100 and parameter maintenance computer system 120 may communicate, and distribution network 130 may further comprise an Internet connection through which FHV meter 100 and parameter maintenance computer system 120 communicate. Any other combination of networks, including secured and unsecured network communication links, are contemplated for use in the systems described herein.

In another embodiment, distribution network 130 may utilize manpower and non-transitory tangible computer readable media to distribute FHV parameters from parameter maintenance system 120 to FHV meter 100. For example, parameter maintenance system 120 may write the FHV parameters to a portable non-transitory computer medium such as a floppy disk, USB flash drive, memory card, portable hard drive, etc. A person may then distribute the FHV parameters to FHV meters 100, 101 and 102 by physically connecting the computer readable medium to each FHV meter in the network. Once connected, FHV meter 100 may then read the FHV parameters from the computer readable medium and configure itself accordingly.

In one embodiment, security breach messages may be sent from FHV meters 100, 101 and 102 to parameter maintenance computer system 120. In such embodiments, FHV meters 100, 101 and 102 may comprise a wireless transmitter and distribution network 130 may be a wireless network as described above. When FHV meters 100, 101 and 102 detect a security breach, they may generate a security breach message and transmit it via distribution network 130 to parameter maintenance computer system 120. In some embodiments, parameter maintenance computer system 120 may send a "kill" message to a FHV meter from which parameter computer system 120 has received a security breach message, providing an extra layer of security. In other embodiments, parameter maintenance computer system may issue a warning, such as graphical display, email alert, electronic alert, etc, upon receipt of a security breach message. Conditions triggering a security breach message are described in more detail with respect to FIG. 2.

Figure 2:
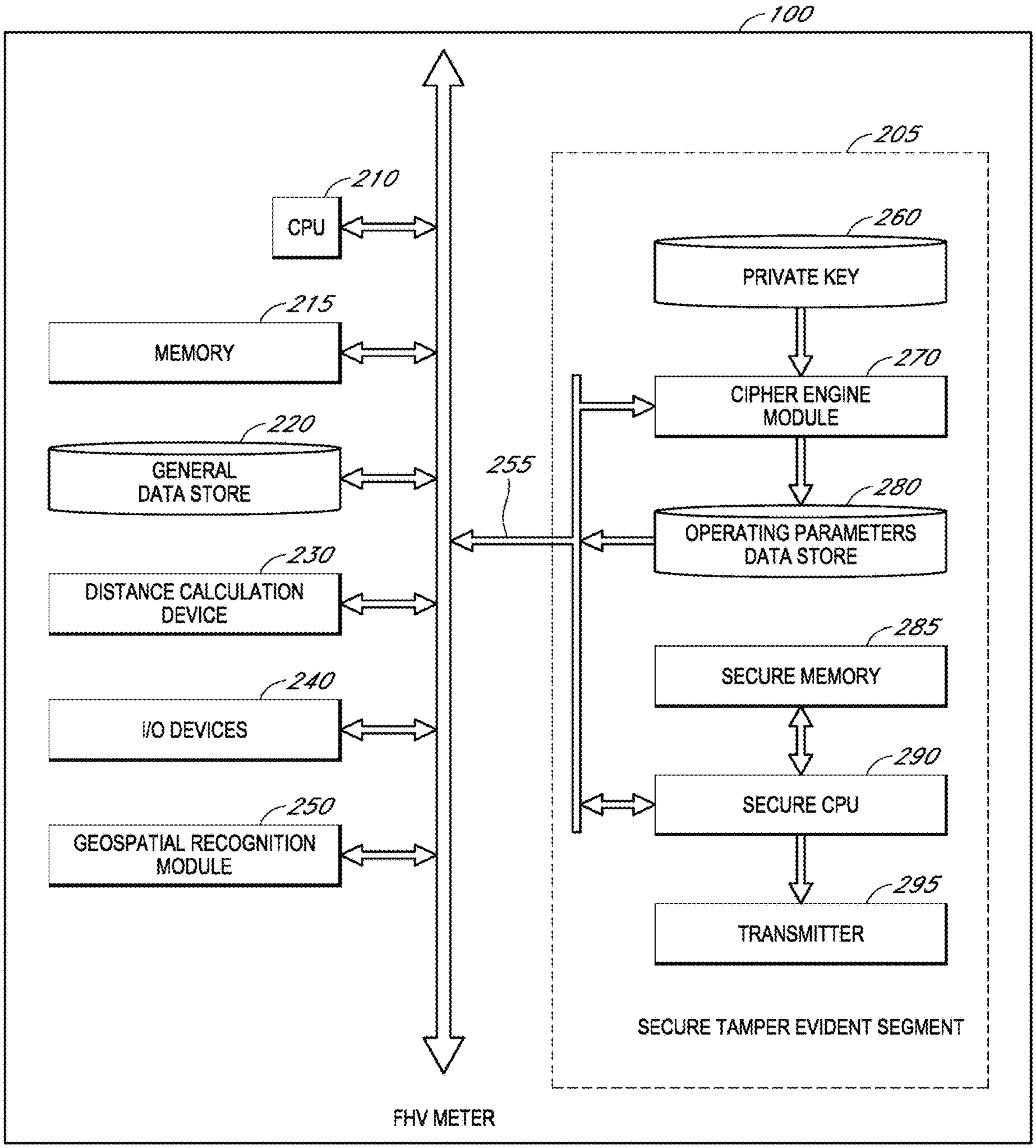
FIG. 2 is a block diagram showing one embodiment of a for-hire vehicle meter.

FIG. 2 is a block diagram showing one embodiment of FHV meter 100.

In one embodiment, FHV meter 100 may be a dedicated computing device that attaches to, or on, a FHV and has external interfaces for communicating with other computer systems attached to, on, or in the FHV. In other embodiments, FHV meter may be a separate computing module that is part of the existing computer system of the FHV. In such embodiments, the FHV meter may be not be visible from within the interior of the FHV meter, and the FHV meter may make use of existing input/output devices of the FHV for displaying information, such as fare information, to the driver and passenger of the FHV.

In one embodiment, FHV meter 100 is configured to interface with multiple devices and/or data sources, such as in the exemplary network of FIG. 1. FHV meter 100 may be used to implement certain systems and methods described herein. For example, in one embodiment, FHV meter 100 may be configured to calculate fares for passengers that hire for-hire vehicles ("FHVs"). FHV meter 100 may also be configured to receive and decrypt FHV operating parameters and operate according to those parameters. The functionality provided for in the components and modules of FHV meter 100 may be combined into fewer components and modules or further separated into additional components and modules.

In one embodiment, FHV meter 100 comprises secure tamper evident segment ("secure segment") 205. Secure segment 205 represents the components and modules of FHV meter 100 that must be secure from tampering, or show evidence of tampering, in order to abide by the regulations and laws governing for-hire vehicles ("FHVs"). In some embodiments, secure segment 205 may be self destructing, that is, if someone tampers with secure segment 205, the components and modules of secure segment 205 will no longer operate. For example, the storage medium storing software instructions for the modules of secure segment may break, or split, if there is an attempt to remove the storage medium from FHV meter 100. In other embodiments, if someone tampers with secure segment 205, FHV meter 100 might send a signal to parameter maintenance computer system 120 containing a security breach message. In one embodiment, the degree of tampering detected may advantageously signal different levels of response. For example, if the tampering is physical or certain (for example a secure component is removed or replaced), FHV meter 100 might automatically shut down. If the tampering is only likely but not certain (for example a signal security check is invalid) then a security breach message indicating a warning signal might be triggered so that the regulatory agency or fleet owner can inspect the meter.

In some embodiments, secure segment 205 may be fixed to the FHV. In such embodiments, the portions of FHV meter 100 that are not in secure segment 205 ("unsecure portion") may be removed from the FHV for necessary repairs. In some embodiments, the unsecure portion may be housed in one casing allowing for easy removal from the FHV for repair or updates. This may allow, for example, the driver to remove the unsecured portion from the for-hire vehicle when it is not in operation in order to prevent theft. The driver may then reconnect the unsecure portion on his next shift without requiring the oversight of a regulatory agency. In other embodiments, the individual components of the unsecure portion may be removed. In some embodiments, the unsecure portion may be the same for every FHV meter in the exemplary network configuration of FIG. 1. Such a configuration may allow for easy repair of the components of the unsecure portion without requiring a regulatory agency to reseal the entire meter. In addition, this embodiment may also permit drivers to pick up any of a group of unsecured portions as they start their shift thus rendering the need to pre-assign the unsecured portion of the meter to a particular driver or vehicle.

In some embodiments, secure segment 205 and the unsecure portion may be connected via a custom interface such as interface 255. The interface may comprise, in some embodiments, a unique shape or design such that only an unsecure portion and a secure segment 255 of the same make or model may be connected. For example, the unsecure portion may comprise an interface in the shape a male "T" shape and the secure segment may comprise an interface 255 of a female "T" shape.

In one embodiment, a visual indicator of tampering may be adhered to the components of secure segment 205 so that if someone tampers with secure segment 205, the indicator will be broken. The visual indicator may indicate one state when no one has tampered with secure segment 205, and another state when someone has tampered with it. For example, self destructing tape may be used to wrap the physical portions of secure segment 205 so that if they are changed or replaced the tape breaks. The tape may indicate a first state (un-torn) when no tampering with secure segment 205 has occurred. The tape may indicate a second state, (torn) when tampering has occurred. In another embodiment, secure segment 205 may be implemented via a software module. The module may monitor reads and writes to and from the modifiable data stores of secure segment 205 such as operating parameters data store 270. When an unauthorized read or write occurs to operating parameters data store 270, the module may notify another module in FHV meter, or in other embodiments, may trigger a visual indicator that can be visually inspected. For example, if FHV meter is implemented as a dedicated computer system attached to a FHV, FHV meter may have a light that is green when no unauthorized reads or writes has occurred. Upon detection of a unauthorized write, the monitoring module may command the light to change to red, indicating that the secure segment has been compromised.

In general, the word module, as used herein, refers to logic embodied in hardware or firmware, or to a collection of software instructions stored on a non-transitory, tangible computer-readable medium, possibly having entry and exit points, written in a programming language, such as, for example, C, C++, C #, or Java. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules may be stored in any type of computer-readable medium, such as a memory device (e.g., random access, flash memory, and the like), an optical medium (e.g., a CD, DVD, BluRay, and the like), firmware (e.g., an EPROM), or any other storage medium. The software modules may be configured for execution by one or more CPUs in order to cause FHV meter 100 to perform particular operations.

It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

In one embodiment, FHV meter 100, includes a dedicated computer that is IBM, Macintosh or Linux/Unix compatible. In another embodiment, FHV meter 100 may be a customized computing device configured only to operate as a meter in a for-hire vehicle. In another embodiment, FHV meter 100 may be a module that is part of the internal computing system of the for-hire vehicle. FHV meter 100 may, in some embodiments, include one or more central processing units ("CPU") 210, which may include one or more conventional or proprietary microprocessors. FHV meter 100 may further include memory 215, such as random access memory ("RAM") for temporary storage of information and read only memory ("ROM") for permanent storage of information, and general data store 220, such as a hard drive, diskette, or optical media storage device. In certain embodiments, general data store 220 stores data needed for the basic functioning of FHV meter. In other embodiments, general data store 220 might store historical trip information. Embodiments of general data store 220 may store data in databases, flat files, spreadsheets, or any other data structure known in the art. Typically, the modules of FHV meter 100 are in communication with one another via a standards based bus system. In different embodiments, the standards based bus system could be Peripheral Component Interconnect (PCI), Microchannel, SCSI, Industrial Standard Architecture (ISA) and Extended ISA (EISA) architectures, for example. In another embodiment, FHV meter 100 leverages computing and storage services available over the Internet (cloud computing).

In one embodiment, general data store 220 contains a data structure, or data element, that uniquely identifies the FHV meter. In some embodiments, the data element may be an integer that represents the serial number of the FHV meter. In other embodiments, the data element may be a string or a character array that is unique to the FHV meter. For example, the data element might be 12345678 or "09GTR67RXY." In other embodiments, the unique identifier may be an object or a data structure with several elements that when combined represent a unique identifier for the FHV meter. For example, the make and model of the FHV meter, combined with the license plate number and registration state of the FHV may be used in combination to uniquely represent the FHV meter.

FHV meter 100 is generally controlled and coordinated by operating system software, such as the Windows 95, 98, NT, 2000, XP, Vista, Linux, SunOS, Solaris, PalmOS, Blackberry OS, or other compatible operating systems. In Macintosh systems, the operating system may be any available operating system, such as MAC OS X. In another embodiment, FHV meter 100 may be controlled by a proprietary operating system. Conventional operating systems control and schedule computer processes for execution, perform memory management, provide file system, networking, and I/O services, and may provide a user interface, such as a graphical user interface ("GUI") for display, among other things.

FHV meter 100 may include, in some embodiments, device calculation device 230 for calculating the distance traveled by the FHV. Device calculation device may be a separate computer system from FHV meter 100, or as in the embodiment depicted in FIG. 2, a module of FHV meter 100. For example, distance calculation device 230 may be part of the internal computer system of the for-hire vehicle that FHV meter 100 is connected, or it may be a dedicated computer that is connected to FHV meter via input/output ("I/O") devices and interfaces 240. Device calculation device 230 may receive input pulses representing the number of turns of the FHV's wheels. The input pulses, in some embodiments, may be received from I/O devices and interfaces 240. The input pulses may be generated by a dedicated device for counting wheel turns, or in some embodiments, the input pulses may be generated by FHV's internal computer system. Distance calculation device 230 may send calculated distance values to CPU 210 which may then in turn be used to calculate fares based on operating parameters.

FHV meter 100 may include one or more commonly available I/O devices and interfaces 240, such as for example, a printer, buttons, a keyboard, a LED display, a monitor, a touchpad, a USB port, a RS 232 port and the like. In one embodiment, I/O devices and interfaces 240 include one or more display devices, such as a monitor, that allows the visual presentation of data, such as fare and operation data, to a user. In the embodiment of FIG. 2, I/O devices and interfaces 240 provide a communication interface to various external devices. For example, in this embodiment FHV meter 100 is in communication with a distribution network, such as any combination of one or more LANs, WANs, or the Internet, for example, via a wired, wireless, or combination of wired and wireless, connections via a network interface of I/O devices and interfaces 240. The communications interface may also include, for example, ports for sending and receiving data such as a USB port or an RS 232 port. In some embodiments, FHV meter may communicate with one or more external devices such as the FHV internal computer system, a printer, a GPS device, etc. by sending and receiving data on ports such as a USB port or a RS 232 port.

In one embodiment, the FHV meter may have geospatial recognition module 250. Geospatial recognition module 250 may include a GPS receiver for receiving GPS coordinates from GPS satellites. In some embodiments, the GPS coordinates received from geospatial recognition module 250 may used to calculate fares based on FHV parameters stored in operating parameters data store 270.

Secure segment 205 of FHV meter 100 may, in some embodiments, include a private key 260. Private key 260 may be, in some embodiments, software instructions and/or data used to decrypt data. In one embodiment, private key 260 is hard-coded on firmware such as programmable read-only memory ("PROM") and may be unique to the embodiment of FHV meter 100. In other embodiments, private key 260 may not be unique and may be the same in one or more embodiments of FHV meter 100. The PROM storing private key 260 may be self destructing if tampered with, that is, if the PROM is removed from the FHV, it will snap and self destruct. For example, epoxy may be placed over private key 260 such that it could not be removed from secure segment 205 without chipping or damaging private key 260.

In one embodiment, secure segment 205 of FHV meter may also include cipher engine module 270. Cipher engine module 270 may, in some embodiments, contain software instructions used to decipher coded or encrypted data packets containing FHV parameters. Cipher engine module 270 may use private key 260 to decrypt data packets received from distribution network 130. Cipher engine module 270 may also include software instructions for extracting FHV parameters and storing them in operating parameters data store 280. In some embodiments, cipher engine module 270 may be hard coded to firmware such as PROM. The PROM storing cipher engine module 270 may be self destructing if tampered with, that is, if the PROM is removed from the FHV, it will snap and self destruct. For example, epoxy may be placed over cipher engine module 270 such that it could not be removed from secure segment 205 without chipping or damaging it.

FHV meter 100 may also include operating parameters data store 280. Operating parameters data store 280 may, in some embodiments, store the operating parameters by which FHV meter 100 operates. For example, CPU 210 may access operating parameters data store 280 when calculating time-distance charges or determining surcharges. Operating parameters data store 280 may be, in some embodiments, a secure data store. In one embodiment, operating parameter data store 280 may only be accessed for writing by cipher engine module 270. Thus, while CPU 210 may access operating parameters data store 280 for reading FHV operating parameters, CPU 210 would not be able to perform write operations to operating parameters data store 280. Accordingly, FHV parameters cannot be changed by software instructions stored in general data store 220 or some other data store connected to FHV meter 100. This may, in some embodiments, be accomplished by only wiring the write pins of operating parameters data store 280 to the firmware containing the software instructions for cipher engine module 270. For example, operating parameters data store 280 may be a RAM chip whereby only cipher engine module 270 is connected to the write pins of the RAM. In some embodiments, operating parameter data store 280 may self destruct if someone tampers with the configuration. In other embodiments, operating parameter data store 280 may be physically connected to FHV with a tamper evident seal that indicates one state if someone tampers with operating parameter data store 280 and another state if no one has tampered with operating parameter data store 280.

FHV meter 100 may include secure memory 285 and secure CPU 290. Secure memory 285 may be a non-transitory, tangible, computer readable medium such as random access memory ("RAM") for temporary storage of information and read only memory ("ROM") for permanent storage of information. Secure memory 285 may store software instructions that cause secure 290 to perform the methods of the embodiments described herein. FHV meter 100 may also include, in some embodiments, transmitter 295. Transmitter 295 may be a wireless transmitter that sends messages over a network, such as distribution network 130. In one embodiment, transmitter 295 may only send signals and not receive signals from outside computer systems. In some embodiments, transmitter 295 may send signals generated by secure CPU 290 such as security breach messages, or in other embodiments, it may send data to parameter maintenance computer system 120 that parameter maintenance computer system 120 may process to detect tampering with FHV meter 100. In other embodiments, transmitter 295 may be able to receive certain security signals, such as a "kill" message sent by parameter maintenance computer system 120.

In one embodiment, the FHV meter may implement security measures to ensure that secure segment 205 remains in communication with the unsecure portions of FHV meter 100. The security measures may prevent instances of fraud where a person may attempt to replace either secure segment 205 or the unsecure portions of FHV meter 100 with a device intended to calculate fraudulent fares. In some embodiments, when the implemented security measure fails, CPU 210 or secure CPU 290 may initiate a shutdown sequence that causes FHV meter 100 to cease operating. In other embodiments, when the implemented security measure fails, CPU 210 may send a security breach message via I/O devices 240 that may be transmitted back to parameter maintenance computer system 120. In some embodiments, the transmission may be a wireless communication. In some embodiments, the security breach message may be transmitted from secure segment 205 by secure CPU 290 via transmitter 295. In other embodiments, the security breach message may be displayed on the monitor of FHV meter 100.

In one embodiment, the security measure may be implemented via a software handshake between secure CPU 290 and CPU 210. If the software handshake fails, then CPU 210 will shutdown causing FHV meter 100 to cease operation, or in other embodiments may transmit a security breach message to parameter computer system 120. The handshake starts with CPU 210 generating a key, or hash, that is stored in memory 215 and known to secure CPU 290. CPU 210 may then send the hash over to secure CPU 290. Secure CPU 290 may then increment, or otherwise modify the hash, according to an algorithm known both to CPU 210 and to secure CPU 290. Secure CPU 290 may store the incremented hash in secure memory 285 before sending it to CPU 210. Upon receipt of the incremented data, CPU 210 may then access the previously sent hash, increment it according to the algorithm, and compare the result to the data received from secure CPU 290. If the incremented data matches the result, the handshake continues whereby CPU 210 increments the data received from secure 290, stores it in memory 215, and then sends it to secure CPU 290. The process will repeat until either CPU 210 or secure CPU 290 receives a hash it was not expecting.

One example of the software handshake may be as follows: Both CPU 210 and secure CPU 290 are programmed with a handshake algorithm that increases the received hash value by 1. CPU 210 starts the handshake by generating "5", storing "5" in memory 215 and then sending "5" to secure CPU 290. Secure CPU 290 receives "5" and determines if that is the known starting point for the handshake. Once secure CPU 290 determines that known starting point is correct, it generates "6" (5+1), stores "6" in secure memory 285 and then sends "6" to CPU 210. When CPU 210 receives "6", it pulls the last sent hash out of memory 215, specifically, "5." CPU 210 then applies the handshake algorithm to arrive at an expected value of "6." Since the expected value of "6" matches the received value of "6", CPU 210 repeats the process by generating a "7", storing a "7" in memory 215 and then sending "7" to secure CPU 290. Secure CPU 290 receives "7" and pulls the last sent hash ("6") out of secure memory 285, applies the algorithm (to arrive at "7") and then compares the expected value ("7")

with the received value ("7"). If the code matches, the process repeats. If it anytime CPU 210 or secure CPU 290 do not receive the expected value, a shutdown sequence may commence rendering FHV meter 100 inoperable.

In one embodiment, instead of a software handshake, a double polling verification security measure may be employed. In this embodiment, CPU 210 may constantly poll secure CPU 290 for a first specific response. If CPU 210 ever receives a value it does not expect, it will cease operations of FHV meter 100. At the same time, secure CPU 290 may poll CPU 210 for a second specific response. If secure CPU 290 does not receive the expected response, it may also contain code that initiates a shut down sequence of FHV meter 100.

In another embodiment, an odometer check may be done as a security measure. In such embodiments, secure CPU 290 may receive data from distance calculation device 230 and secure memory 285 may store software instructions that estimates the odometer reading of the FHV to which FHV Meter 100 is attached. Also, CPU 210 may be programmed to periodically check the odometer of the vehicle to which the FHV meter is attached. In other embodiments, CPU 210 may be programmed to access odometer information from a third party computer system that maintains odometers readings of vehicles, such as Department of Motor Vehicles computer systems or CARFAX? computer systems. CPU 210 may then send the odometer value to secure CPU 290. Secure CPU 290 may then store the odometer reading in secure memory 285. In some embodiments, secure CPU 290 may then compare the odometer value received from CPU 210 with an estimated odometer value calculated from the previous odometer received from CPU 210. If the estimated odometer value varies substantially (for example, the difference is greater than 10% or 15%) from the odometer value received from CPU 210, secure CPU 290 may then initiate a shutdown sequence, or in other embodiments, send a security breach message to parameter maintenance computer system 120 via transmitter 295.

In some embodiments, data may be sent to parameter maintenance computer system 120 and it may use the data to determine if there has been tampering with secure segment 205. Parameter maintenance computer system 120 may be configured to receive data from a wireless transmitter connected to CPU 210 on the unsecure portion of the FHV meter and from transmitter 295 connected to secure CPU 290. Parameter maintenance computer system 120 may then compare the data received to data it was expecting to determine if FHV meter was subject to tampering. For example, parameter maintenance computer system 120 may receive a first predetermined numeric value or code from CPU 210 via I/O devices 240 and a second predetermined numeric value or code from secure CPU 290. Parameter maintenance computer system 120 may then compare the received values to a matched pair of expected values to determine if secure segment 205 is attached to the proper unsecure portion. For example, parameter maintenance computer system 120 may store the assignment of the unsecure portion to secure segment 205 based on the serial number CPU 210 and the serial number of secure CPU 290 as a pair of values. The pair of values indicates the assignment of unsecure portion to secure segment 205. On a periodic basis, CPU 210 may send to parameter maintenance computer system 120 a data message containing the serial number of the CPU via I/O devices 240. Secure CPU 290 may also send a message to parameter maintenance computer system 120 via transmitter 295 containing the serial number of secure CPU 290. Parameter maintenance computer system 120 may then compare the received values to the expected pair of values for the meter. If values do not match, parameter maintenance computer system 120, in one embodiment, may generate a "kill" message disabling the for-hire vehicle meter. In another embodiment, parameter maintenance computer system 120 may issue a warning message if the values do not match.

Figure 3:
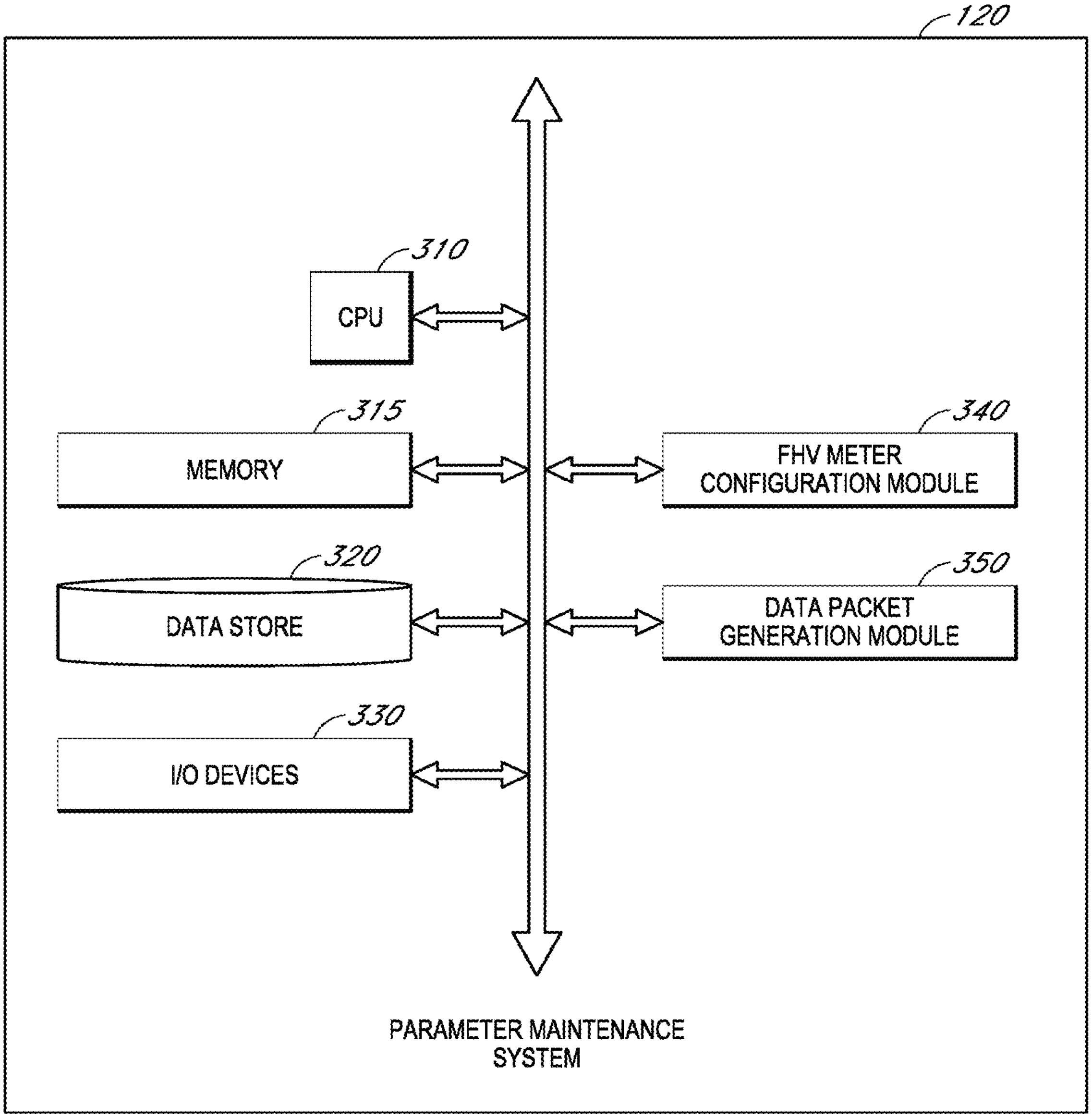
FIG. 3 is a block diagram showing one embodiment of a parameter maintenance computer system.

FIG. 3 is a block diagram of one embodiment of parameter maintenance computer system 120. In one embodiment, parameter maintenance computer system 120 is configured to interface with multiple devices, such as shown in the exemplary network of FIG. 1. Parameter maintenance computer system 120 may be used to implement certain systems and methods described herein. The functionality provided for in the components and modules of parameter maintenance computer system 120 may be combined into fewer components and modules, or further separated into additional components and modules.

In one embodiment, parameter maintenance computer system 120 includes, for example, a server or a personal computer that is IBM, Macintosh, or Linux/Unix compatible. In another embodiment, parameter maintenance computer system 120 comprises a laptop computer, smart phone, personal digital assistant, or other computing device, for example. In one embodiment, the exemplary parameter maintenance computer system 120 includes one or more central processing units ("CPU") 310, which may include one or more conventional or proprietary microprocessors. Parameter maintenance computer system 120 further includes a memory 315, such as random access memory ("RAM") for temporary storage of information and a read only memory ("ROM") for permanent storage of information, and a data store 320, such as a hard drive, diskette, or optical media storage device. In certain embodiments, data store 320 stores FHV meter data and one or more sets of FHV operating parameter data. Embodiments of data store 320 may store data in databases, flat files, spreadsheets, or any other data structure known in the art. Typically, the modules of parameter maintenance computer system 120 are in communication with one another via a standards based bus system. In different embodiments, the standards based bus system could be Peripheral Component Interconnect (PCI), Microchannel, SCSI, Industrial Standard Architecture (ISA) and Extended ISA (EISA) architectures, for example. In another embodiment, parameter maintenance computer system 120 leverages computing and storage services available over the Internet (cloud computing).

Parameter maintenance computer system 120 is generally controlled and coordinated by operating system and/or server software, such as the Windows 95, 98, NT, 2000, XP, Vista, Linux, SunOS, Solaris, PalmOS, Blackberry OS, or other compatible operating systems. In Macintosh systems, the operating system may be any available operating system, such as MAC OS X. In another embodiment, parameter maintenance computer system 120 may be controlled by a proprietary operating system. Conventional operating systems control and schedule computer processes for execution, perform memory management, provide file system, networking, and I/O services, and provide a user interface, such as a graphical user interface ("GUI"), among other things.

The exemplary parameter maintenance computer system 120 may include one or more commonly available input/output (I/O) interfaces and devices 330, such as a keyboard, mouse, touchpad, and printer. In one embodiment, the I/O devices and interfaces 330 include one or more display devices, such as a monitor, that allows the visual presentation of data to a user. More particularly, a display device provides for the presentation of GUIs, application software data, and multimedia presentations, for example. In the embodiment of FIG. 3, the I/O devices and interfaces 330 provide a communication interface to various external devices. For example, in this embodiment parameter maintenance computer system 120 is in communication with distribution network 130, such as any combination of one or more LANs, WANs, or the Internet, for example, via a wired, wireless, or combination of wired and wireless, connections via a network interface of the I/O devices and interfaces 330.

In the embodiment of FIG. 3, parameter maintenance computer system 120 also includes several application modules that may be executed by CPU 310. The software code of the modules may be stored on a non-transitory computer-readable medium such as for example, RAM or ROM. More particularly, the application modules include FHV configuration module 340 and data packet generation module 350. In some embodiments, parameter maintenance computer system 120 may be operated by a regulatory agency, or in some embodiments, by a FHV fleet operator under the supervision of a regulatory agency. Parameter maintenance computer system 120 may, in some embodiments, be secured via a username and password. In other embodiments, parameter maintenance computer system 120 may be located in physically secure location such that only authorized personnel may access parameter maintenance computer system 120.

In one embodiment, FHV configuration module 340 may comprise software code executable by CPU 310 that handles the configuration of for-hire vehicles. In some embodiments, configuration of for-hire vehicles ("FHVs") is done through the creation and modification of FHV operating parameters. In some embodiments, the FHV operating parameters may be defined as indicated above. In some embodiments, FHV operating parameters may be defined and modified through the use of a user interface generated by FHV configuration module 340. FHV configuration module 340 may generate a user interface and present it to a user of parameter maintenance system 120 so that the user may assign values to various FHV parameters. Once a user defines the parameters, they may be stored to data store 320 or they may be sent to data packet generation module 350.

In one embodiment, data packet generation module 350 may comprise software code executable by CPU 310 that handles the generation of data packets that may be deployed via distribution network 130 to FHV meters such as FHV meter 100. The generation of the data packet may be in a format the FHV meter can interpret. For example, the data packet may be an XML file, text file, serialized object, COM object, byte stream, or any other data format known in the art. The data packet generation module 350 may generate a data packet unique to the target FHV meter. In other embodiments, data packet generation module 350 may generate a data packet that may be used by several different FHV meters.

Figure 4:
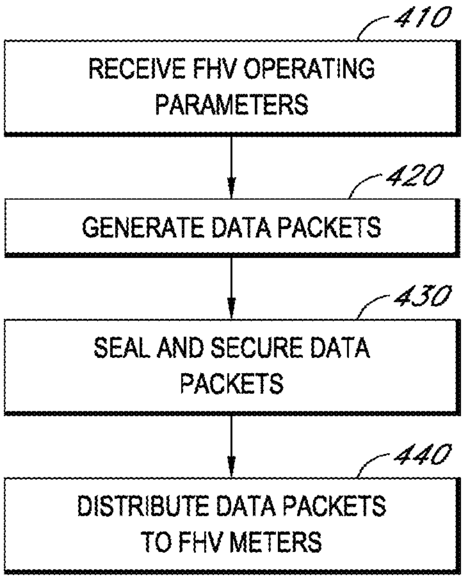
FIG. 4 is a flowchart showing the temporal flow of data for generating a secure data packet of for-hire vehicle parameters in one embodiment of a parameter maintenance computer system.

FIG. 4 shows the temporal flow of data for generating secure data packets for FHV parameters in one embodiment of parameter maintenance computer system 120. First, in box 410, parameter maintenance computer system 120 receives FHV operating parameters. In general, the FHV operating parameters may be defined by a regulatory agency that controls and regulates for-hire vehicles ("FHVs"). The operating parameters may be received by parameter maintenance computer system 120 through the use of a user interface generated by FHV configuration module 340. In some embodiments, once parameter maintenance computer system 120 receives the FHV parameters, it may store them in data store 320.

Next, in box 420 parameter maintenance computer system 120 generates data packets for distribution or deployment to FHV meter 100. The data packets generated by parameter maintenance computer system 120 may contain the FHV operating parameters received in box 410. In one embodiment, several FHV parameters are included in a data packet. A data packet may be, in some embodiments, the group of FHV operating parameters that are to be distributed to a particular FHV meter. In one embodiment, parameter maintenance computer system 120 may generate a different data packet for each FHV meter in distribution network 130. In other embodiments, it may generate a data packet for more than one FHV meter in the distribution network. In such embodiments, the FHV meters of distribution network 130 may share the same private key for decryption purposes.

In one embodiment, each generated data packet contains a header. The header may contain metadata used by FHV meters in distribution network 130 containing a unique identifier corresponding to the FHV meter that should read the data packet. For example, if parameter maintenance computer system 120 generates a data packet for FHV meter 123456578, the data packet might contain metadata indicating that the data packet is for FHV meter 12345678. The metadata of the header may be configured to match the unique identifier scheme of the FHV meters in distribution network 130.

In some embodiments, the data packet may be generated by parameter maintenance computer system 120 as an XML file. The root node of the XML file may correspond to metadata. For example, the root node may contain the unique identifier of the FHV meter for which the data packet was generated. The first child nodes of the root node ("second level nodes") may correspond to one or more group-FHV operating parameters. The second level nodes may, for example, define the validity duration of a group of FHV operating parameters, or in other embodiments, geospatial validity of a group of FHV operating parameters. The child nodes of the second level nodes ("third level nodes") may contain FHV operating parameters such as time and distance-traveled parameters, geospatial point parameters, variable operating cost surcharge parameters, fare initiation parameters or fare termination parameters. In other embodiments, the data packet may be generated as a text file, serialized object, data stream, or any other data format known in the art suitable for transferring data between computer systems. In some embodiments, the data packet may not be hierarchal, but instead defined in a flat structure with a series of name-value pairs indicating the various FHV parameters and their associated values.

In box 430, parameter maintenance computer system 120 seals and secures the data packets generated in box 420. In one embodiment, parameter maintenance computer system 120 seals and secures the data packets using an asymmetrical encryption means such as public-private key encryption. In such embodiments, parameter maintenance computer system 120 may encrypt the data packet based on a public key associated with FHV meter 100. In some embodiments, the public key of FHV meter 100 may be unique to the FHV meter. For example, FHV meter with serial number 123 may have a different public key than FHV meter with serial number 987. In other embodiments, the public key for more than one FHV meter may be the same. For example, all of the FHV meters of a particular manufacturer, or for a particular for-hire vehicle fleet operator, may share the same public key. Parameter maintenance computer system 120 may seal and secure the data packets by using a standard encryption algorithm such as for example, Data Encryption Standard (DES), Advanced Encryption Standard (ADS), Pretty Good Privacy (PGP), International Data Encryption Algorithm (IDEA), Blowfish, RCS, CAST, etc. One skilled in the art can appreciate that any encryption algorithm may be used to seal and secure the data packets generated by parameter maintenance computer system 120.

Moving to box 440, once the data packet has been sealed and secured, it may be distributed to FHV meters in distribution network 130. The distribution of packets may vary depending on the embodiment. For example, in one embodiment data packets may be transferred to a portable non-transient computer readable medium such as CD-ROM, diskette, or USB flash drive. In such an embodiment, an individual under a regulatory agency's authority supervision and control may manually load the sealed and secure data packets to each FHV meter. In some embodiments, one medium may be generated for each FHV meter. This may occur in embodiments where the FHV meter is dedicated computer system. For example, in some embodiments, a data packet may be loaded onto a plurality of USB flash drives, each of the USB flash drives corresponding to one of the FHV meters in distribution network 130. An agent of the regulatory agency may insert the USB flash drive into the USB port of the FHV meter intended to be loaded with the data packet stored on the USB flash drive. In such embodiments, the USB flash drive may act as a USB Dongle, that is, the FHV meter may only operate when the USB flash drive is inserted into the FHV meter. The agent may then seal the USB Dongle to the FHV meter using a visual indicator of tampering such as color coded self destructible tape, special plastic tie, special metal tie, or seal. The visual indicator may then act as evidence of tampering; if the visual indicator is broken, it will serve as an indication that the USB Dongle may have been tampered with.

In other embodiments, distribution of sealed and secure data packets may occur over a wireless network. In such embodiments, each FHV meter in distribution network 130 may have a wireless receiver capable of receiving a wireless network signal. Parameter maintenance computer system 120 may broadcast, on a periodic basis, data packets for various FHV meters. In some embodiments, the FHV meters may listen for all data packets broadcast by parameter maintenance computer system 120. Using the header information of the data packet, the FHV meter may then determine if the data packet should be used to update its parameters by comparing the unique identifier information of the data packet to the unique identifier information stored in general data store 220.

In other embodiments, FHV meters may run server software, such as a telnet server, socket server, or any other means of communicating over a TCP port that allows for communications with parameter maintenance computer system 120. In such embodiments, the FHV meters of distribution network 130 may be assigned a dedicated IP address. Parameter maintenance computer system 120 may store, in data store 320, the IP address, the unique identifier, and in some embodiments the public key, associated with FHV meter 100. The stored data may then be used to distribute the data packet to a specific FHV meter such as FHV meter 100. For example, parameter maintenance computer system 120 may generate a data packet and include in the header the unique identifier of FHV meter 100. After the data packet is generated, parameter maintenance computer system 120 may seal the data packet according to the public key. Then, parameter maintenance computer system 120 may use the IP address of the FHV meter to start a session with the FHV meter and open a port for communication. Parameter maintenance computer system 120 may then transfer the data packet directly to its intended target FHV meter.

In other embodiments, FHV meter 100 may pull data packets from parameter maintenance computer system 120 as opposed to parameter maintenance computer system 120 pushing data packets to FHV meter 100. For example, FHV meter 100 may, via a wireless connection, poll parameter maintenance computer system 120 on a periodic basis to determine if any data packets have been generated since the last request. The request may include, for example, the unique identifier of the FHV meter. Parameter maintenance computer system 120 may respond to the request by sending a data packet corresponding to the unique identifier of the FHV meter. In some embodiments, parameter maintenance computer system 120 may respond with a null message, or a message indicating no data packets were generated since the last request. In some embodiments, FHV meter 100 may make an update request daily, every other day, or weekly. In some embodiments, the FHV meters within distribution network 130 may be configured to make update requests at different points during an update period so that network traffic is minimized. For example, FHV meter 100 may make an update request daily at 9 AM, FHV meter 101 may make an update request daily at 10 AM, and FHV meter 102 may make an update request at daily 11 AM.

The distribution methods of sealed and secured data packets described herein with reference to box 440 are meant as examples and should not be interpreted as the sole means for distributing data packets within distribution network 130. It can be appreciated that the distribution of data between the systems of distribution network 130 may vary according to the needs and limitations of the particular embodiment and the distribution methods described herein may be tailored to satisfy the needs, and work within the limitations, of any particular distribution network.

Figure 5:
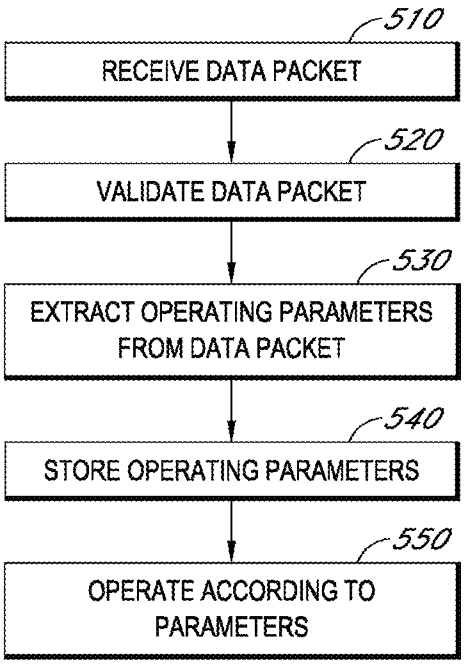
FIG. 5 is a flowchart showing the temporal flow of data for processing a secure data packet in one embodiment of a for-hire vehicle meter.

FIG. 5 is a flowchart showing the temporal flow of data for processing a secure data packet in one embodiment of FHV meter 100. Starting in box 510, FHV meter 100 receives a data packet containing FHV operating parameters. As described above, there are numerous means for receiving the data packet, including but not limited to, receipt from a computer medium directly connected to the FHV meter and receipt of the data packet via a wireless receiver. Once the data packet has been received, FHV meter must process the data packet.

Processing begins, in one embodiment, by validating the data packet in box 520. Validation of data packets may start, in one embodiment, by examining the metadata header of the data packet for a value representing the unique identifier of the data packet's target FHV meter. If the data packet contains a unique identifier not matching the unique identifier of FHV meter 100, processing stops and the data packet may be discarded, or deleted, from memory 215. If the data packet contains a unique identifier matching the unique identifier of FHV meter 100, FHV meter 100 may continue to validate the packet by decrypting it. In other embodiments, the data packet does not contain a metadata header, or the metadata header may not include a unique identifier. In such embodiments, the validation process may begin by FHV meter 100 attempting to decrypt the data packet. For example, cipher engine module 280 may attempt to decrypt the data packet using private key 260. Once decrypted, FHV meter 100 may attempt extract operating parameters from the data packet. If FHV meter 100 cannot extract usable operating parameters from the data packet, then the data packet fails validation. In such embodiments, the data packet may then be discarded, or deleted from RAM. In some embodiments, if the data packet fails validation, FHV meter 100 may shut down or send a message to parameter maintenance computer system 120 that it received a data packet that failed validation.

Once the packet has been validated, FHV meter 100 extracts operating parameters from the data packet in box 530 if it has not already done so during the validation step. The extraction of operating parameters depends on the embodiment. For example, if the data packet was generated as an XML file, FHV meter 100 may analyze the XML file to determine the FHV operating parameters. In other embodiments, if the data packet is a serialized object, FHV meter 100 may desterilized the object, and then extract the FHV parameters using the object's interface. In other embodiments, the data packet may be implement as a byte stream, in which case, FHV meter 100 may parse the byte stream in order to determine the operating parameters.

In box 540, once the operating parameters have been extracted, they may be stored in operating parameters data store 270. In box 550, the stored operating parameters may be accessed by CPU in order to calculate fares. The fares may be calculated based on stored time and distance-traveled parameters, geospatial point parameters, variable operating cost surcharge parameters, fare initiation parameters or fare termination parameters. The stored parameters may be used in conjunction with other modules of FHV meter 100 to calculate fares such as, for example, distance calculation device 230 or geospatial recognition module 250.

All of the methods and tasks described herein may be performed and fully automated by a computer system. The computer system may in some cases include multiple distinct computers or computing devices (e.g., physical servers, workstations, storage arrays, etc.) that communicate and interoperate over a network to perform the described functions. Each such computing devices typically includes a processor (or multiple processors) that executes program instructions or modules stored in a memory or other non-transitory computer-readable storage medium. The various functions disclosed herein may be embodied in such program instructions, although some or all of the disclosed functions may alternatively be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices such as solid state memory chips and/or magnetic disks, into a different state.

The foregoing description details certain embodiments of the invention. It will be appreciated, however, that no matter how detailed the foregoing appears in text, the invention can be practiced in many ways. It should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A secure, for-hire vehicle ("FHV") meter updating system comprising:

a plurality of FHV meters each comprising a secure tamper evident portion and an unsecure portion, said plurality of FHV meters communicably coupled to a distribution network, wherein the secure tamper evident portion comprises a private key, said private key stored on a hardware, said hardware showing evidence of tampering in response to attempts to remove said hardware;

a parameter maintenance system in communication with the FHV meters, the parameter maintenance system comprising:

a processor; and one or more non-transitory computer readable storage media storing a software that when executed by the processor causes the processor to perform operations comprising:

maintaining FHV meter parameters, the FHV meter parameters comprising values representing at least one of time or distance;

generating data packets for at least one FHV meter;

passing, via the distribution network, the data packets to the FHV meter;

receiving, via the distribution network from the FHV meter, a predetermined numeric value or code from a secure tamper evident portion;

using at least the received value or code to determine if said FHV meter has been tampered with;

generating a kill message disabling the FHV meter when the FHV meter is determined to have been tampered with;

the plurality of FHV meters each comprising:

a meter processor; and one or more meter non-transitory computer readable storage media storing a meter software that when executed by the meter processor causes the meter processor to perform operations comprising:

receiving, via the distribution network, configuration data from said parameter maintenance system; and configuring itself using the configuration data.

2. The secure, for-hire vehicle meter updating system of claim 1 wherein said parameter maintenance system receives for-hire vehicle meter operating parameters.

3. The secure, for-hire vehicle meter updating system of claim 1 wherein generating data packets for at least one FHV meter comprises generating data packets comprising FHV meter operating parameters.

4. The secure, for-hire vehicle meter updating system of claim 3 wherein said parameter maintenance system secures the data packets.

5. The secure, for-hire vehicle meter updating system of claim 4 wherein said parameter maintenance system secures the data packets via encryption.

6. The secure, for-hire vehicle meter updating system of claim 4 wherein said parameter maintenance system sends the secured data packets to the distribution network.

7. The secure, for-hire vehicle meter updating system of claim 1 wherein said plurality of for-hire vehicle meters comprise an unsecure portion which is interfaced with said secure tamper evident portion.

8. The secure, for-hire vehicle meter updating system of claim 7 wherein said unsecure portion comprises a distance calculation device.

9. The secure, for-hire vehicle meter updating system of claim 7 wherein said unsecure portion comprises a global positioning system ("GPS") receiver.

10. The secure, for-hire vehicle meter updating system of claim 1 wherein a cipher engine module decrypts a data packet using the private key.

11. The secure, for-hire vehicle meter updating system of claim 1 wherein said plurality of for-hire vehicle meters extract for-hire vehicle meter operating parameters from a decrypted data packet.

12. The secure, for-hire vehicle meter updating system of claim 1 wherein at least one of said plurality of for-hire vehicle meters shuts down when it receives a kill message.

13. The secure, for-hire vehicle meter updating system of claim 1 wherein said parameter maintenance system pushes the configuration data out to said plurality of for-hire vehicle meters through the distribution network.

14. The secure, for-hire vehicle meter updating system of claim 1 wherein said plurality of for-hire vehicle meters pulls the configuration data from said parameter maintenance system through the distribution network.

15. The secure, for-hire vehicle meter updating system of claim 14 wherein said plurality of for-hire vehicle meters pulls the configuration data from said parameter maintenance system through said distribution network at predetermined times.

16. The secure, for-hire vehicle meter updating system of claim 14 wherein said plurality of for-hire vehicle meters pulls the configuration data from said parameter maintenance system on a daily basis.

* * * * *